D. Stevens,

Cutter Head.

No. 106,421. Patented Aug. 16, 1870.

Witnesses:
L. S. Mabee
Alex. F. Roberts

Inventor:
D. Stevens
Per Munn & Co
Attorneys.

United States Patent Office.

DARIUS STEVENS, OF DANBURY, CONNECTICUT.

Letters Patent No. 106,421, dated August 16, 1870.

IMPROVEMENT IN CUTTER-HEAD FOR PLANING-MACHINE.

The Schedule referred to in these Letters Patent and making part of the same.

*To all whom it may concern:*

Be it known that I, DARIUS STEVENS, of Danbury, in the county of Fairfield and State of Connecticut, have invented a new and useful Improvement in Molding Cutter-Head; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved cutter-head for holding the cutters for forming moldings, which shall be simple in construction, convenient in use, and will hold the cutters securely; and It consists in the construction of the cutter-head and cap-plates, as hereinafter more fully described.

A is the cutter-head, the faces of which are recessed to receive the cutters B.

Upon the forward parts of the ends of the faces of the cutter-head A are formed projections or lugs *a'*, the upper sides of which may be so formed as to correspond somewhat with the outer surface of the cap-plates C.

Figure 1:
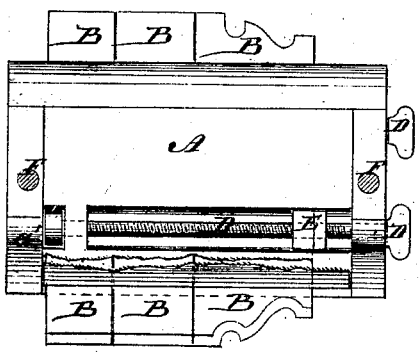
Figure 1 is a top view of my improved molding cutter-head, the cap-plate being removed, and part of the cutters being broken away to show the construction.
Figure 2:
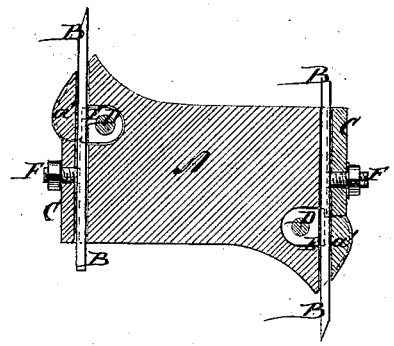
Figure 2 is a detail cross-section of the same, taken through the line *x x*, fig. 1.
Figure 3:
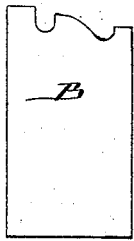
Figure 3 is a plan view of one of the cutters.

The faces of the cutter-heads A, near their forward sides, are recessed or grooved, as shown in figs. 1 and 2, to receive the screws D, said screws passing in through holes in the ends of the cutter-head A, the lugs *a'* giving sufficient strength to said parts of the cutter-heads to prevent the screws from breaking out.

The screws D are swiveled to the cutter-head A, so that while being free to turn they will be unable to move longitudinally.

The cutters B are made without slots, and are secured in place laterally by the nuts E, which fit into and slide in the grooves in the faces of the cutter-head A.

The nuts E are made with a shoulder upon their outer ends, which project along the edge of the cutters B, as shown in dotted lines in fig. 2, so that by turning the screws D in one direction the nuts E will be moved forward, and will clamp the cutters B laterally, and by turning the screws D in the other direction the nuts E will be drawn back, releasing the cutters.

C are the cap-plates, the forward parts of the ends of which are notched to receive the lugs *a'*, and said cap-plates are secured to the cutter-head A by the bolts F, which are attached to or screwed into the shoulders at the end parts of the faces of the cutter-head A, and pass through the end parts of the cap-plates C.

The cap-plates C are secured in place, clamping the cutters B to the faces of the cutter-heads A by nuts screwing upon the bolts F, as shown in fig. 2, or by screwing the said bolts into the said cutter-heads.

If desired, the lugs *a'* may be omitted, the shoulders of the ends of the cutter-heads furnishing sufficient strength to prevent the swiveled bolts from breaking out. In this case the cap-plates do not require to be notched.

Having thus described my invention,

I claim as new and desire to secure by Letters Patent—

The combination and arrangement of the swiveled screws D and sliding nuts E with the grooved cutter-head A, for the purpose of clamping the cutters B laterally, substantially as herein shown and described.

DARIUS STEVENS.

Witnesses:
GEORGE H. WILLIAMS,
L. P. HOYT.